Aug. 31, 1954
E. C. RAINEY
2,687,597
MEANS FOR ELECTRICALLY DESTROYING UNDESIRED
PLANT LIFE ALONG CROP ROWS
Filed April 2, 1951
4 Sheets-Sheet 1
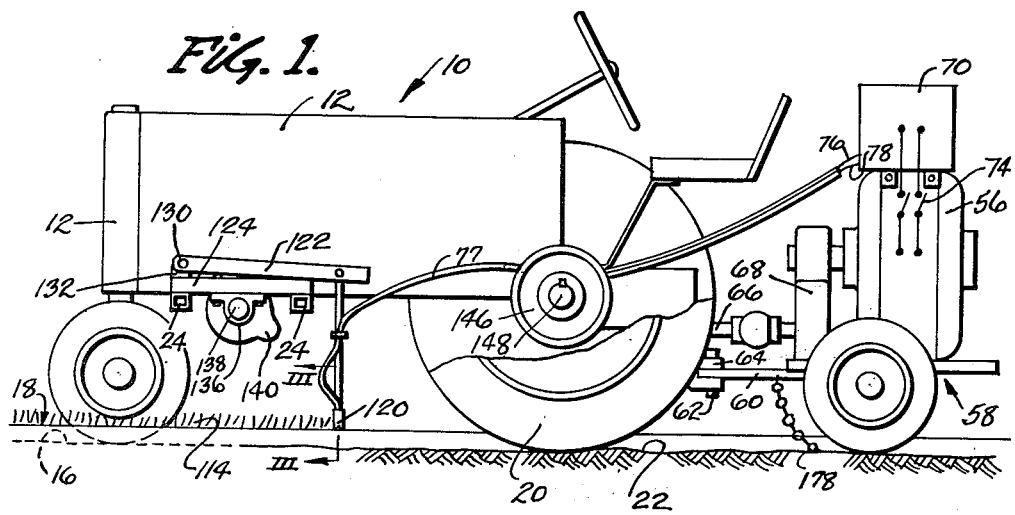
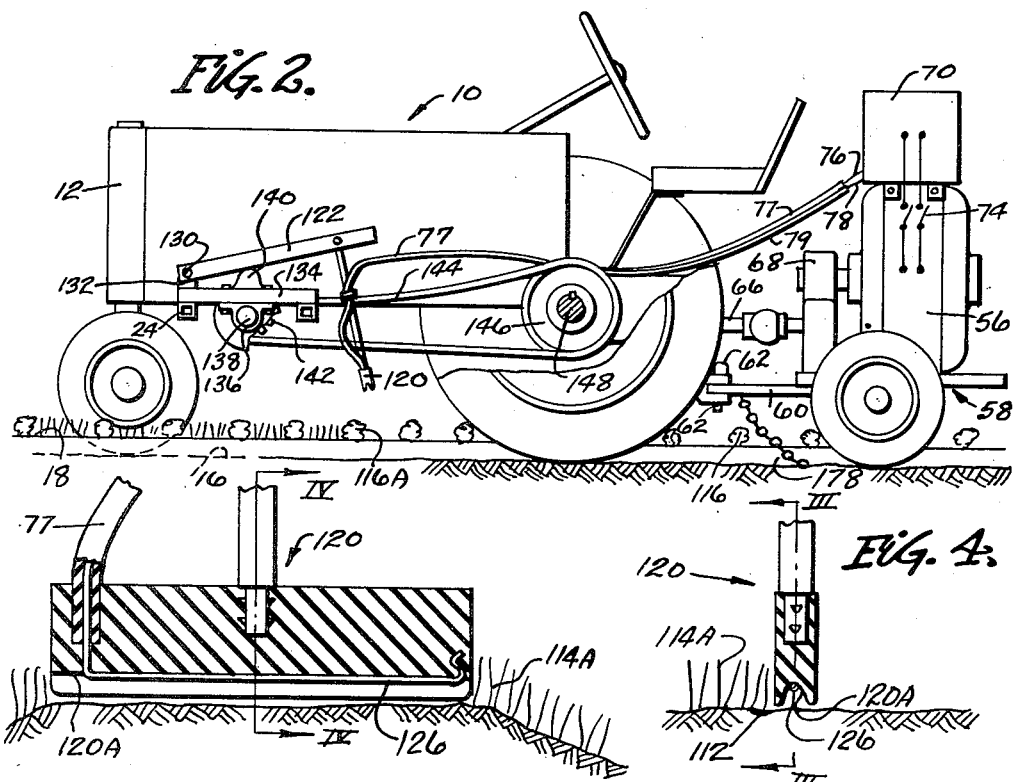
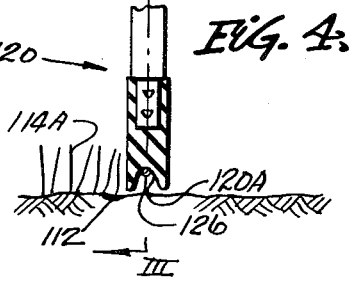
Inventor
EARL CECIL RAINEY
Weatherford and
Weatherford
Attorneys

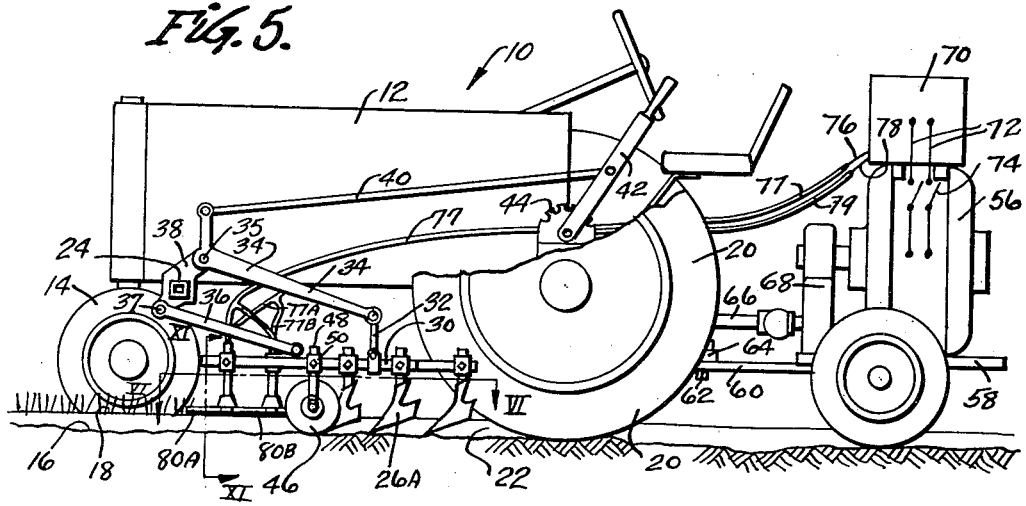

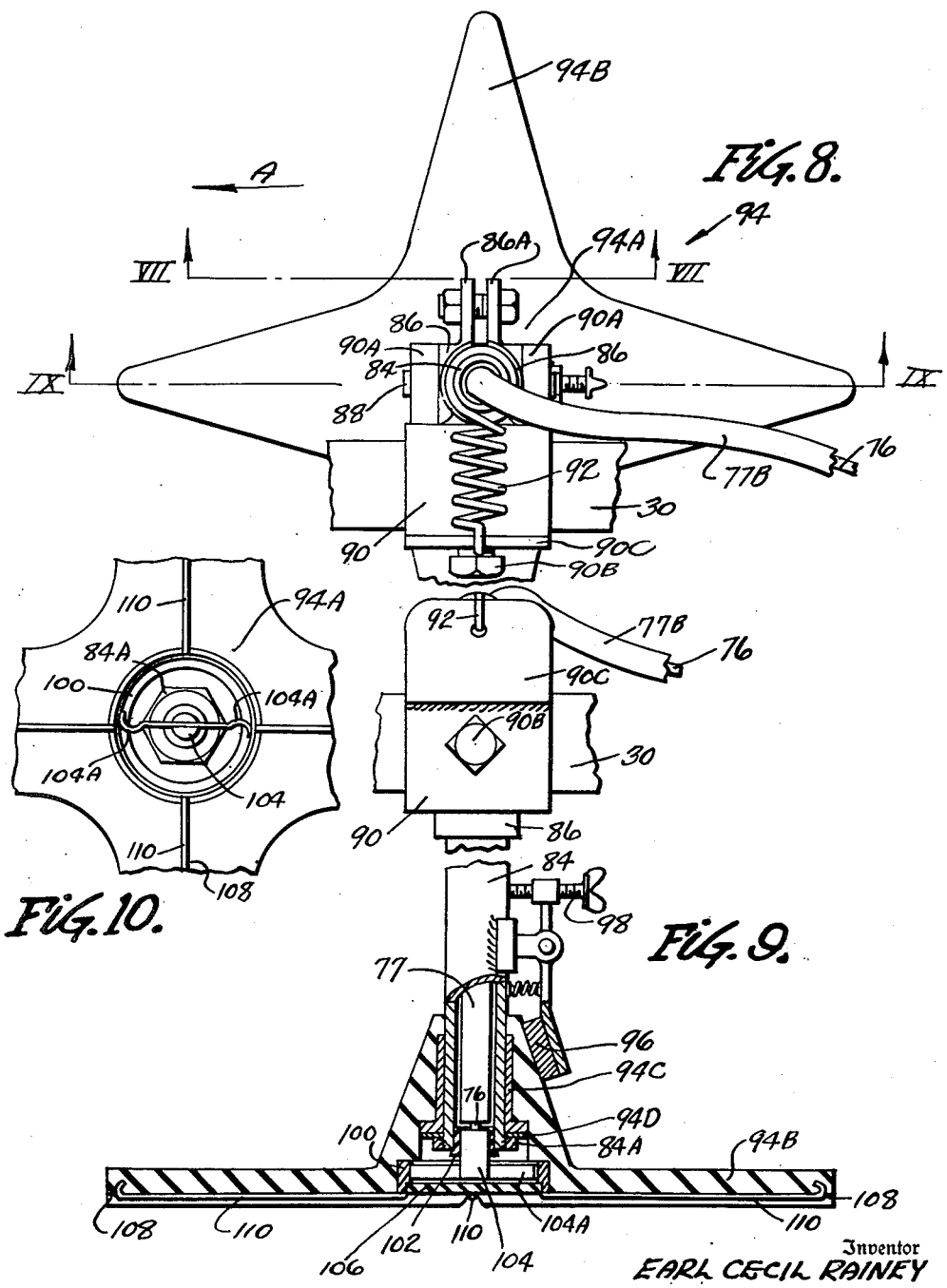

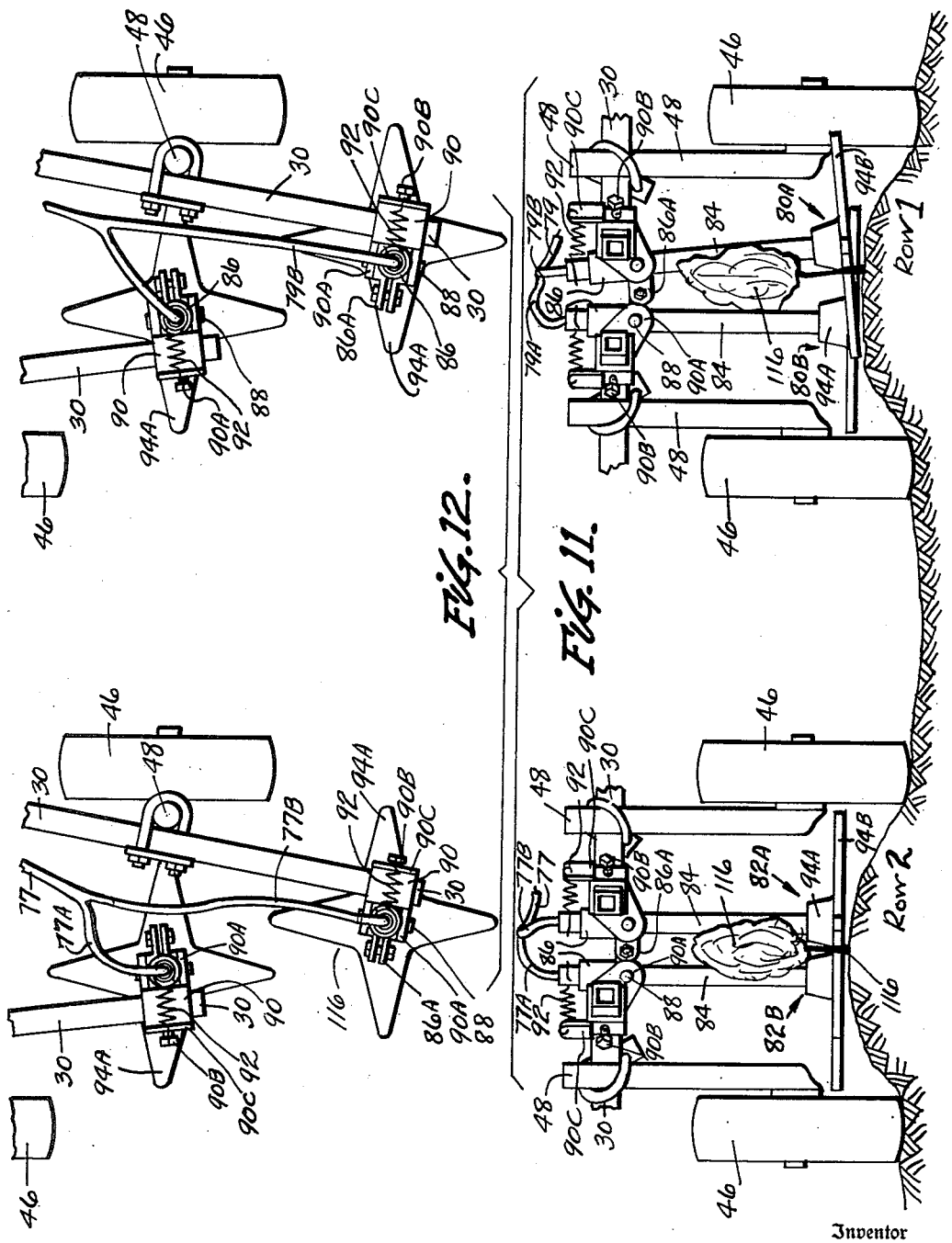

Patented Aug. 31, 1954

2,687,597

UNITED STATES PATENT OFFICE 2,687,597

MEANS FOR ELECTRICALLY DESTROYING UNDESIRED PLANT LIFE ALONG CROP ROWS

Earl Cecil Rainey, near Tyronza, Ark.

Application April 2, 1951, Serial No. 218,866

14 Claims. (Cl. 47—1.3)

In the cultivation of rows of plants raised from seed, a constant fight exists between the plants and the weeds, grass and insect life, and the grass, weeds and insects must be destroyed at various times during the growth of the plants.

The present invention particularly applies to plants in rows which at an early step of growth are thinned to establish hills containing one or more plants and to the destruction of the undesired weeds, grass and insect life. The invention contemplates selectively applying killing charges of electric current during various stages of the plant growth to successive and repeated undesired plant growths and insect life.

After crops are planted it is usually found that grass and weeds spring up much faster than the crop plants and choke the later appearing and slower growing plants, and that insect eggs turned up during planting hatch into embryo insects or such insects break through the ground surface and are protected by the grass and weeds. It is also found that later some of these insects are dislodged from the plants during cultivation.

This invention relates to means for destroying such initially appearing weeds and grass and such insects by electric current.

It also relates to means for so destroying grass, weeds and insect life, and undesired plants at uniform intervals along a plant row, leaving hills of plants spaced at such uniform intervals; and It more particularly relates to means and methods by which after the hills of plants are established by the destruction of plant life intermediate such hills, and the plants have by subsequent growth become more sturdy, clearing out of weeds and grass which have sprung up between the hills, is controlled by the existing more advanced plants of the hills, and during this destruction insects which have infested the plants are shaken off and also destroyed.

In the typical cultivation of row plants, intermediate plants, weeds, and grass are chopped out either by machinery or hand and hills of plants established. Plants in the hills continue to grow and become sturdy but grass and weeds again spring up between the hills and a second, or in cases even a third, chopping is necessary to remove them. Owing to variations in conditions no way has been found to insure a uniformity of hill spacing that will permit a second or additional chopping by machines, and hand chopping becomes a definite necessity which labor scarcity and expense often turn into a calamity, and even where labor is available insects in the embryo stage and subsequent conditions of growth are merely displaced rather than killed during hand or machine chopping.

The objects of the invention are:

To provide means and methods for destroying weeds, grass, undesired plant life and insects along plant rows by electric currents.

To provide means for effecting electrically the destruction of plant and other life along the rows at interrupted intervals, leaving undestroyed hills of plants at such intervals.

To provide, subsequent to the establishment of hills of plants along rows, and growth and strengthening of the plants, means controlled by the plants of the hills for electrically effecting the destruction of grass, weeds, plant life and insects between said hills.

In general under the present invention these objects are accomplished by the generation of an electric current, preferably A. C. stepping this current up to high voltage, passing this high voltage current to ground through the plant or other life to be destroyed and interrupting this action where plants are to be retained.

The means by which the foregoing and other objects are accomplished and the method of their accomplishment will readily be understood from the following specification on reference to the accompanying drawings, in which the various views are of a two-row machine.

Fig. 1 is a side elevational view typically outlining a farm tractor and related electric apparatus, including a current generator and voltage amplifier and preliminary apparatus for using high voltage current to destroy plant and insect life continuously along the rows.

Fig. 2 is a substantially identical view with a cam and driving chain and pulleys installed to raise the plant destroying element and interrupt its action at desired intervals to leave hills of plants at such intervals.

Fig. 3 is a transverse sectional elevational view on the line III—III of Figs. 1 and 4.

Fig. 4 is a sectional elevational view on the line IV—IV of Fig. 3.

Fig. 5 is a further view of the same tractor and current generating equipment with the preferred type of current distributing apparatus used for the plant controlled destruction of undesired plant and other life.

Fig. 6 is a fragmentary sectional plan view taken on the line VI—VI of Fig. 5 showing two rows.

Fig. 7 is an enlarged sectional elevational view taken as on the line VII—VII of Fig. 8.

Fig. 8 is a plan view of one of the control units and a fragmentary portion of the support thereof, with an arrow indicating the direction of advance movement.

Fig. 9 is an elevational view of the unit and a fragmentary part of the support, with the lower portion of the view in sectional elevation on the line IX—IX of Fig. 8.

Fig. 10 is an inverted plan view of the hub portion of the control element with the insulating cover for the wiper and ring removed.

Fig. 11 is a front elevational view taken rearward of the section line XI—XI of Fig. 5 showing relation of the plant controlled current distributing apparatus to the rows and plants.

Fig. 12 is a corresponding plan view of the same parts.

Referring now to the drawings in which the various parts are indicated by numerals, 12 indicates the body portion of a typical two row farm tractor 10 having front wheels 14 which are adapted to run in the furrow 16 between two rows 18 and main wheels 20 which are adapted to run in the furrows 22 outside those rows, the tractor having the usual power plant within and concealed by the body 12 and having as usual a power take-off through which auxiliary mechanism may be driven.

Tractors of this type have or may be readily equipped with transversely disposed support arms 24 which are provided for carrying various types of detachable auxiliary cultivating apparatus, and insofar as the present apparatus is concerned form readily available supporting means. The tractors are also usually equipped with various types of power take-off mechanism not here shown which are available as a source of power for auxiliary mechanisms requiring power.

The present invention is preferably used in connection with sets of plows on opposite sides of the tractor body, Fig. 5, which are used to cultivate the sides of the rows, and which form grounds for electric circuits. Each set may be made up of two gangs of plows 26A, 26B and 28A, 28B respectively, the gangs 26A, 26B cultivating one row and the gangs 28A, 28B the other. One set of plows is typical of both sets and each of the gangs 26A, 26B of all the gangs and the description hereinafter will be confined in the main to the foreground gang 26A. The plows 26A are jointly supported from the arms 24 in various ways in different makes of tractors, and are raised and lowered in various ways often by elaborate hydraulic mechanism which forms no part of the present invention and is not shown.

As illustrating a construction which may be used, the plows, as the plows 26A, are jointly supported by a beam 30, which is hung by a hanger 32 carried by a lever 34 and the beam may be steadied by a brace lever 36 pivoted to the beam. Brace lever 36 is preferably attached by pivot 37 to a bracket 38, which in turn is carried by the support arm 24. The lever 34 may be a bell crank lever, pivoted as at 35 to bracket 38, and may be connected through a link 40 with a hand lever 42 by which the plows as a gang are raised and lowered. 44 is a notched quadrant associated with the hand lever to hold the plows in raised or lowered positions. Each beam is preferably provided forward of the plow with a pilot wheel 46, which is carried by a post 48 vertically adjustable in a sleeve member 50 mounted on the beam, and may be adjusted to run in the furrows 16 or 22 as the case may be, or on top of the row 18.

In accordance with the present invention an electric generator 56 is associated with or directly carried by the tractor, and is shown as carried by a trailor 58, detachably coupled as through a reach rod 60 and pin 62 to a coupler hitch 64 of the tractor.

The generator is preferably driven by a power take-off (not shown) of the tractor power plant through a coupling shaft 66 and speed step-up gears concealed within a gear housing 68 but may be otherwise powered if desired.

Associated with the generator is a voltage step-up coil or transformer 70 shown mounted on the generator, which steps up the voltage of the generated current to such high voltage, preferably of the nature of 25,000 volts, as may be required. The generator and coil are connected by leads 72 which preferably include a cut off switch 74.

From the coil 70, leads 76 and 78 respectively extend preferably through conduits 77 and 79 on opposite sides of the tractor to plant destroying means carried by the two batteries of plows 26 and 28, the coil circuits being completed from the destroying means through grounds established by the plows and the frame of the tractor and trailer.

The preferred construction of the destroying means is shown in Figs. 5 through 9 in which destroying units 80A, 80B, and 82A, 82B respectively carried by the beams 30 of the sets of plows 26 and 28, the coil lead 76 extending through the conduit 77 and its branches 77A, 77B to the destroying units 80A and 80B and the lead 78 through the conduit 79 and its branches 79A, 79B to the units 82A and 82B, Figs. 5 and 6.

Each of these units as the units 80A includes an upright post 84, preferably tubular which may be adjustably mounted in a sleeve 86, having clamping ears 86A, and extends below the sleeve. The sleeve 86 in turn is preferably hinged through pins 88 to ears 90A projecting from a sleeve 90, which sleeve is slidably carried by one of the beams 30 and secured against movement therealong as by a set screw 90B. Preferably the pins 88 are at the level of the lower edge of the sleeve and permit the lower end of the post to swing freely outward but coact with the body of the sleeve to prevent inward movement past vertical. The post normally hangs in upright position but may be additionally so urged as by a tension spring 92, anchored at one end to a lug 90C extending upward from the sleeve 90, and at its opposite end to the post.

Journalled on the lower end of the post 84 is a star wheel 94 of insulating material as rubber or Bakelite. The wheel includes a hub 94A and prongs 94B, and preferably includes a bushing 94C turning freely on the post 84, and is retained from dropping off the post as by a nut 84A and an interposed washer 94D, the hub being chambered to receive these parts and to a depth to house both the nut and end of the post well above the bottom of the wheel. Preferably the post carries adjustable braking means including a shoe 96 which may be tightened against the hub of the wheel as by a screw 98 where conditions indicate that free turning of the wheel should be more or less restrained or prevented. Below the lower end of the post and the nut 84A, the wheel carries an annular collector ring 100 which turns with the wheel. Disposed within the lower end of the post 84 is an insulating sleeve 102 which receives and rigidly carries a distributor plug 104 electrically connected to the lead 76, the plug slidably contacting the interior of the collector ring 100.

Below the fingers 104A and the plug 104 a disc of insulating material 106 may be pressed into the collector ring to protect the fingers and post from exterior contact.

The under sides of the star wheel prongs 94B are each provided with a radial groove 108 in which is disposed a substantially coextensive distributor wire 110 electrically secured to the colector ring 100 at its inner end and embedded for support at its outer end in the prong. In cross section the grooves 108 are wider and slightly deeper than the diameter of the distributor wires 110 and house the wires from contact with the tops of the rows but permit ready contact with plant or insect life, the prongs and wires forming destructor bars identified by the prong numerals 94B.

In planting seed (not shown) along the row, eggs (not shown) and larvae 112 of insects are brought to the surface and after the rows are planted and before the seeds sprout, grass and weeds 114 (Fig. 1) spring up which choke the plants 116 (Fig. 2) as they subsequently appear and undesirably protect the eggs and larvae for subsequent growth into insects which attack the plants.

Initial destruction of such grass, weeds, insect eggs and larvae before the plant seeds have sprouted may be accomplished continuously along the rows, by disposing one prong 94B of each of the wheels of the destroyer units 80A, 80B, 82A, 82B, transversely across the rows, locking the wheels against turning, and progressing the wheels along the rows. Preferably, however, as shown in Fig. 1 bars of insulating material, of which only the bar 120 in the foreground is shown, are disposed transversely across the rows and are supported at their opposite ends as by hangers 122 which in turn are supported by members 124 carried by the support arms 24 of the tractor. The bars 120 are provided on their under sides with grooves 120A. These grooves house each a distributor wire 126, Fig. 3, which is connected at one end through the conduit carried lead 76 from the coil 70 and embedded at the other end for support in the insulating bar and form of each destructor bar identified by the bar numeral 120. Should plows not be used with this a ground 178 is carried preferably by the trailer 58.

Subsequently after the plant seeds have sprouted and grown into the plants 116, and a new crop of grass and weeds 114A have grown up therearound and therebetween, the intervening plants and grass may be chopped out by hand and hills of plants 116A established, or the intermediate plants may be destroyed by electric currents in accordance with this invention and the hills thus established.

To accomplish this electrically, Fig. 2 shows the tractor equipped with the same transverse destructor bars 120, hangers 122 and supporting members 124 carried by the support arms 24, and the distributor wire 126 energized as before. The members 124 may be coupled by pivot pins 130 to brackets 132 mounted on the support arms 24. The arms 24, Fig. 2, also carry frame members 134 which support bearings 136. The bearings journal a shaft 138 to which a cam 140 and a sprocket 142 are secured, the cam underlying the supporting members 124 and abruptly raising and lowering the destructor bar 120 at uniformly spaced intevals, it being here noted that the insulation of the destructor bar prevents contact of the distributor wire with the sides of the plant during raising and lowering. The sprocket 142 may be driven through a chain belt 144 by a sprocket 146 secured on the axle 148 of the tractor. Forward movement of the tractor abruptly raises and lowers the transverse destructor bar 120 clear of the plants of the row at interrupted intervals.

The method of destroying undesired plant and insect life comprises, first, the destruction of all plant and insect life continuously along the row before the planted seed have sprouted and the desired plants have broken through the surface of the row, and, second, after the plants to be retained have subsequently appeared and established a stand, and grass and weeds have again grown up therebetween, the establishment of definite hills of plants with intervening plant life and insect life destroyed.

Third, after further growth of the plants in the hills, and additional grass and weeds have grown up therebetween, the use of the plants in the hills to determine the areas of undesired growth to be destroyed.

In the first of these stages the tractor 10, the coupled generator 56 and coil 70 with the switch 74 closed, and the depending transversely disposed destructor bars 120, Figs. 1, 2, 3 and 4, are moved along the rows with the lower surfaces of the bars slightly above the upper surfaces of the rows by the insulating housing of the bars, but permitting contact with the grass and weeds and through the grass and weeds or directly with the larvae of eggs of the insects and by current flow or arcing causing their destruction.

In the second of these stages subsequent to plant appearance and growth, chopping may be done by hand, or the tractor and other equipment including the destructor bars 120 in accordance with Fig. 2 may be moved along the rows as before. The axle driven sprocket 146 through the chain belt 144 drives the sprocket 142 and cam 140 and raises the destructor bar at uniform intervals to leave the undisturbed hills of plants 116A with intervening spaces free from vegetation or insect life.

Subsequent to the second stage the plants of the hills are allowed to continue their growth until vegetation again growing up between the hills make an additional clearing out necessary. The tractor and other equipment including the star wheels 94, released from locking restraint, is progressed along the rows. The prongs 94B of the wheels engage with and are turned transversely across the rows of the plants to effect destruction of underlying vegetation between the hills. The plants themselves irrespective of variations in spacing establish the limits of the spaces cleared and the side edges of the prongs prevent destructive engagement of the distributor wires 110 with the plants. Should the plants 116A be exactly centered with the machine as it is driven along the left hand row, Fig. 11, both star wheels 94 would successively engage and be turned by the plants and be equally effective. Should however the plants be offset from center relatively to the machine as shown in the right hand row of the same figure, one or the other of the star wheels would be outwardly displaced against the action of gravity and the spring, if used, and damage to the plants not result, but the entire surface of the row would still be covered by successive actions of the two wheels.

I claim:

1. Means for controlling electric current discharge for the destruction of insect and plant life in a machine which includes a mobile carrier adapted to be driven along a row of plants, said carrier mounting a source of electric current, current discharge means adapted to discharge through the plants to ground, a lead electrically connecting said source and said discharge means, and means establishing a ground; said current discharge means including a vertically disposed post, a star wheel of insulating material having a hub portion journalled on the lower end of said post, and said post being offset laterally in excess of the radius of said hub from the center line of said row, said wheel having radial prongs of length to extend from said hub substantially across said row, said prongs being radially grooved on their under sides to provide downwardly faced housings, a wiper ring carried by said wheel and insulated thereby from said post, discharge elements having less width and depth than said grooves, electrically joined to said ring and respectively housed in said grooves above the lower surfaces of said prongs, and wiper fingers, electrically coupled to said lead, carried by and insulated from said post and slidably engaging said ring.

2. Means for controlling electric current discharge for the destruction of insect and plant life in a machine which includes a mobile carrier adapted to be driven along a row of plants, said carrier mounting a source of electric current, current discharge means adapted to discharge through the plants to ground, a lead electrically connecting said source and said discharge means, and means establishing a ground; said current discharge means including a vertically disposed post, a star wheel of insulating material having a hub portion journalled on the lower end of said post, and said post being offset laterally in excess of the radius of said hub from the center line of said row, said wheel having radial prongs of length to extend from said hub substantially across said row, said prongs being radially grooved on their under sides to provide downwardly faced housings, a wiper ring carried by said wheel and insulated thereby from said post, discharge elements having less width and depth than said grooves, electrically joined to said ring and respectively housed in said grooves above the lower surfaces of said prongs, a wiper finger, electrically coupled to said lead, carried by and insulated from said post and slidably engaging said ring, and braking means adapted for restraining engagement with the hub of said wheel.

3. Means for controlling electric current discharge for the destruction of insect and plant life in a machine which includes a mobile carrier adapted to be driven along a row of plants, said carrier mounting a source of electric current, current discharge means adapted to discharge through the plants to ground, a lead electrically connecting said source and said discharge means, and means establishing a ground; said current discharge means including a vertically disposed hollow post, a star wheel of insulating material having a hub portion journalled on the lower end of said post, and said post being offset laterally in excess of the radius of said hub from the center line of said row, said wheel having radial prongs of length to extend from said hub substantially across said row, said prongs being radially grooved on their under sides to provide downwardly faced housings, an annular wiper ring carried by said wheel and insulated thereby from said post, discharge elements having less width and depth than said grooves, electrically joined to said ring and respectively housed in said grooves above the lower surfaces of said prongs, and wiper fingers, electrically coupled to said lead, carried by and insulated from said post and slidably engaging said ring.

4. Means for controlling electric current discharge for the destruction of insect and plant life in a machine which includes a mobile carrier adapted to be driven along a row of plants, said carrier mounting a source of electric current, current discharge means adapted to discharge through the plants to ground, a lead electrically connecting said source and said discharge means, and means establishing a ground; said current discharge means including a vertically disposed hollow post, a star wheel of insulating material having a hub portion journalled on the lower end of said post, and said post being offset laterally in excess of the radius of said hub from the center line of said row, said wheel having radial prongs of length to extend from said hub substantially across said row, said prongs being radially grooved on their under sides to provide downwardly faced housings, an annular wiper ring carried by said wheel and insulated thereby from said post, discharge elements having less width and depth than said grooves, electrically joined to said ring and respectively housed in said grooves above the lower surface of said prongs, wiper fingers, electrically coupled to said lead, carried by and insulated from said post and slidably engaging said ring and braking means adapted for restraining engagement with the hub of said wheel.

5. Means for controlling electric current discharge for the destruction of insect and plant life in a machine which includes a mobile carrier adapted to be traversed along a row of plants, said carrier mounting a source of electric current, current discharge means adapted to discharge through the plants to ground, a lead electrically connecting said source and said discharge means, and means establishing a ground; said current discharge means including a vertically disposed vertically adjustable post, a star wheel of insulating material having a hub portion journalled on the lower end of said post, and said post being offset laterally in excess of the radius of said hub from the center line of said row, means mounted on said carrier and including a horizontal pivot pin parallel to said row, hinging said post adjacent its upper end for swinging movement of said wheel away from said row, and resilient means opposing said movement, said wheel having radial prongs of length to extend from said hub substantially across said row, said prongs being radially grooved on their under sides to provide downwardly faced housings, a wiper ring carried by said wheel and insulated thereby from said post, discharge elements having less width and depth than said grooves, electrically joined to said ring and respectively housed in said grooves above the lower surfaces of said prongs, and wiper fingers, electrically coupled to said lead, carried by and insulated from said post and slidably engaging said ring.

6. Means for controlling electric current discharge for the destruction of insect and plant life in a machine which includes a mobile carrier adapted to be traversed along a row of plants, said carrier mounting a source of electric current, current discharge means adapted to discharge through the plants to ground, a lead electrically connecting said source and said discharge means, and means establishing a ground; said current discharge means including a vertically disposed vertically adjustable post, a star wheel of insulating material having a hub portion journalled on the lower end of said post, and said post being offset laterally in excess of the radius of said hub from the center line of said row, means mounted on said carrier and including a horizontal pivot pin parallel to said row, hinging said post adjacent its upper end for swinging movement of said wheel away from said row, and resilient means opposing said movement, said wheel having radial prongs of length to extend from said hub substantially across said row, said prongs being radially grooved on their under sides to provide downwardly faced housings, a wiper ring carried by said wheel and insulated thereby from said post, discharge elements having less width and depth than said grooves, electrically joined to said ring and respectively housed in said grooves above the lower surfaces of said prongs, wiper fingers, electrically coupled to said lead, carried by and insulated from said post and slidably engaging said ring and braking means adapted for restraining engagement with the hub of said wheel.

7. Means for controlling electric current discharge for the destruction of insect and plant life in a machine which includes a mobile carrier adapted to be traversed along a row of plants, said carrier mounting a source of electric current, current discharge means adapted to discharge through the plants to ground, leads electrically connecting said source and said discharge means, and cultivating means establishing a ground; said current discharge control means including a pair of vertically disposed posts, star wheels of insulating material each having a hub portion respectively journalled on the lower end of said posts, said posts being offset laterally oppositely from the center line of said row, and longitudinally along said row, said wheels each having radial prongs of length to extend from said hub substantially across said row, said prongs being radially grooved on their under sides to provide downwardly faced housings, a wiper ring carried by said wheel and insulated thereby from said post, discharge elements substantially coextensive in length with said grooves, electrically joined to said ring and respectively housed in said grooves above the lower surfaces of said prongs, and wiper fingers, electrically coupled to said lead, carried by and insulated from said post and slidably engaging said ring.

8. Means for controlling electric current discharge for the destruction of insect and plant life in a machine which includes a mobile carrier adapted to be traversed along a row of plants, said carrier mounting a source of electric current, current discharge means adapted to discharge through the plants to ground, leads electrically connecting said source and said discharge means, and cultivating means establishing a ground; said current discharge control means including a pair of vertically disposed posts, star wheels of insulating material each having a hub portion respectively journalled on the lower end of said posts, said posts being offset laterally oppositely from the center line of said row, and longitudinally along said row, said wheels each having radial prongs of length to extend from said hub substantially across said row, said prongs being radially grooved on their under sides to provide downwardly faced housings, a wiper ring carried by said wheel and insulated thereby from said post, discharge elements substantially coextensive in length with said grooves, electrically joined to said ring and respectively housed in said grooves above the lower surfaces of said prongs, wiper fingers, electrically coupled to said lead, carried by and insulated from said post and slidably engaging said ring and braking means adapted for restraining engagement with the hubs of said wheels.

9. Means for controlling electric current discharge for the destruction of insect and plant life in a machine which includes a carrier adapted to be traversed along a row of plants, said carrier mounting a source of electric current, current discharge means adapted to discharge through the plants to ground, leads electrically connecting said source and said discharge means, and means establishing a ground; said current discharge control means including a pair of vertically disposed posts, means mounted by said carrier, hingedly engaging the upper ends of said posts for swinging movements of their lower ends away from said center line, and spring means resisting said movements; star wheels of insulating material, each having a hub portion respectively journalled on the lower end of said posts, said wheels each having four radial prongs of length to extend from said hub substantially across said row, said prongs being radially grooved on their under sides to provide downwardly faced housings, wiper rings carried by said wheels and insulated thereby from said posts, discharge elements electrically joined to said rings and respectively extending outward therefrom in said grooves above the lower surfaces of said prongs, and contact means respectively electrically coupled to said leads, carried by and insulated from said posts and slidably engaging said rings.

10. Means for controlling electric current discharge for the destruction of insect and plant life in a machine which includes a mobile carrier adapted to be traversed along a row of plants, said carrier mounting a source of electric current, current discharge means adapted to discharge through the plants to ground, leads electrically connecting said source and said discharge means, and means establishing a ground; said current discharge control means including a pair of vertically disposed posts, offset laterally oppositely from the center line of said row and hingedly secured adjacent their upper end to said carrier for swinging movement of their lower ends transverse to said row; star wheels of insulating material each having a hub portion respectively journalled on the lower end of said posts, and radial prongs of length to extend from said hub substantially across said row, said prongs being radially grooved on their under sides to provide downwardly faced housings, wiper rings carried by said wheels and insulated thereby from said posts, discharge elements substantially coextensive in length with said prongs, and having less width and depth than said grooves, electrically joined to said rings and respectively housed in said grooves above the lower surfaces of said prongs, wiper fingers, electrically coupled to said leads carried by and insulated from said posts and slidably engaging said rings.

11. In means for destroying undesired plant life by discharge of electric current from a source of electric energy to ground; discharge means which includes an elongated member of insulating material longitudinally grooved on its under side to form a downwardly open flaring groove, and a discharge element of less depth and width than said groove, housed and anchored in said groove, and terminating at one end within said groove, an insulated lead connecting said source to the opposite end of said element, means for supporting said discharge means substantially transverse to, and for moving said discharge means and said energy source along, a row of plants with said discharge means above and adjacent said row, and said housed element in contact with undesired plant and insect life of said row.

12. In means for destroying undesired plant life by discharge of electric current from a source of electric energy to ground; dicharge means which includes an elongated member of insulating material longitudinally grooved on its under side to form a downwardly open flaring groove, and a discharge element of less depth and width than said groove, housed and anchored in said groove, and terminating at one end within said groove, an insulated lead connecting said source to the opposite end of said element, means for supporting said element substantially transverse to, and means for moving said element and said energy source along, a row of plants with said discharge means above and adjacent said row, and said element in contact with undesired plant and insect life of said row and means for shifting said discharge means out of and into contact with said plant and insect life at predetermined intervals during said movement.

13. In means for destroying undesired plant life by discharge of electric current from a source of electric energy to ground; discharge means which includes an elongated member of insulating material longitudinally grooved on its under side to form a downwardly open flaring groove, and a discharge element of less depth and width than said groove, housed and anchored in said groove, and terminating at one end within said groove, an insulated lead connecting said source to the opposite end of said element, means for supporting said discharge means substantially transverse to and for moving said discharge means and said energy source along a row of plants with said discharge means above and adjacent said row, and said element in contact with undesired plant and insect life of said row, and means for raising and lowering said discharge means at pretermined intervals during said movement.

14. In means for destroying undesired plant life by discharge of electric current from a source of electric energy to ground; discharge means which includes an elongated member of insulating material longitudinally grooved on its under side to form a downwardly open flaring groove, and a discharge element of less depth and width than said groove, housed and anchored in said groove, and terminating at one end within said groove, an insulated lead connecting said source to the opposite end of said element, means for supporting said discharge means substantially transverse to and for moving said discharge means and said energy source along a row of plants with said discharge means above and adjacent said row, and said element in contact with undesired plant and insect life of said row, and means for turning said element away from and into said transverse positioning at predetermined interval during said movement.

References Cited in the file of this patent

UNITED STATES PATENTS

| Number | Name | Date |
|---|---|---|
| 565,671 | Cummings | Aug. 11, 1896 |
| 779,791 | Lokuciejewsky | Jan. 10, 1905 |
| 2,327,204 | McLemore | Aug. 17, 1943 |
| 2,484,443 | Baker | Oct. 11, 1949 |
| 2,558,376 | Opp et al. | June 26, 1951 |
| 2,592,654 | Canfield | Apr. 15, 1952 |
| 2,607,165 | Rainey | Aug. 19, 1952 |